(12) United States Patent
Lipton et al.

(10) Patent No.: US 8,049,772 B2
(45) Date of Patent: Nov. 1, 2011

(54) TEMPERATURE COMPENSATION FOR THE DIFFERENTIAL EXPANSION OF AN AUTOSTEREOSCOPIC LENTICULAR ARRAY AND DISPLAY SCREEN

(75) Inventors: Lenny Lipton, Los Angeles, CA (US); Robert Akka, Sausalito, CA (US)

(73) Assignee: RealD Inc., Beverly Hills, CA (US)

( * ) Notice: Subject to any disclaimer, the term of this patent is extended or adjusted under 35 U.S.C. 154(b) by 1349 days.

(21) Appl. No.: 11/588,605

(22) Filed: Oct. 26, 2006

(65) Prior Publication Data
US 2007/0097502 A1     May 3, 2007

Related U.S. Application Data

(60) Provisional application No. 60/730,722, filed on Oct. 27, 2005.

(51) Int. Cl.
*H04N 13/00* (2006.01)
*H04N 13/02* (2006.01)
*H04N 13/04* (2006.01)
*A61B 1/04* (2006.01)
*G02B 23/14* (2006.01)
*G02B 27/22* (2006.01)

(52) U.S. Cl. ............... 348/42; 348/46; 348/51

(58) Field of Classification Search .......... 359/432–477; 348/42–60
See application file for complete search history.

(56) References Cited

U.S. PATENT DOCUMENTS

| 6,535,242 | B1 * | 3/2003 | Strumolo et al. ............ 348/148 |
| 7,190,518 | B1 * | 3/2007 | Kleinberger et al. ......... 359/465 |
| 7,532,272 | B2 * | 5/2009 | Woodgate et al. ............. 349/95 |
| 2002/0044151 | A1 | 4/2002 | Ijima et al. |
| 2002/0140652 | A1 | 10/2002 | Suzuki et al. |
| 2003/0098839 | A1 | 5/2003 | Lee |
| 2004/0252111 | A1 | 12/2004 | Cheon et al. |
| 2004/0263971 | A1 | 12/2004 | Lipton et al. |
| 2005/0059487 | A1 | 3/2005 | Wilder |
| 2005/0122395 | A1 | 6/2005 | Lipton |

FOREIGN PATENT DOCUMENTS

| JP | 09189883 | 7/1997 |
| JP | 20035315 | 1/2003 |
| WO | 20040070467 A2 | 8/2004 |

OTHER PUBLICATIONS

Reasons for rejections received from Japanese Patent office dated Nov. 16, 2010 (Japanese version).

* cited by examiner

*Primary Examiner* — Christopher S Kelley
*Assistant Examiner* — Chikaodili E Anyikire
(74) *Attorney, Agent, or Firm* — Baker & McKenzie LLP (57) ABSTRACT

A method and system for displaying autostereoscopic images is presented. The design comprises a display device, a lenticular array and a computational engine associated with the lenticular array. The computational engine is configured to assess temperature expansion effects for the lenticular array and perform an interdigitation function based on the temperature expansion effects for the lenticular array. Alternately, the design comprises computing a temperature adjustment factor, the temperature adjustment factor relating an amount of expected lenticular array dimensional change to an expected temperature encountered by the lenticular array. Images are interdigitated based on the temperature adjustment factor.

60 Claims, 7 Drawing Sheets

TEMPERATURE COMPENSATION FOR THE DIFFERENTIAL EXPANSION OF AN AUTOSTEREOSCOPIC LENTICULAR ARRAY AND DISPLAY SCREEN

This application claims priority based on U.S. Provisional Patent Application 60/730,722, filed Oct. 27, 2005, entitled "Temperature Compensation for the Differential Expansion of an Autostereoscopic Lenticular Array and Display Screen," inventors Lenny Lipton and Robert Akka, the entirety of which is incorporated herein by reference.

BACKGROUND OF THE INVENTION

1. Field of the Invention

The present design relates generally to the art of autostereoscopic displays, and more specifically to software techniques for mitigating the effects resulting from differential expansion of a lenticular array and its underlying display.

2. Description of the Related Art

Figure 1:
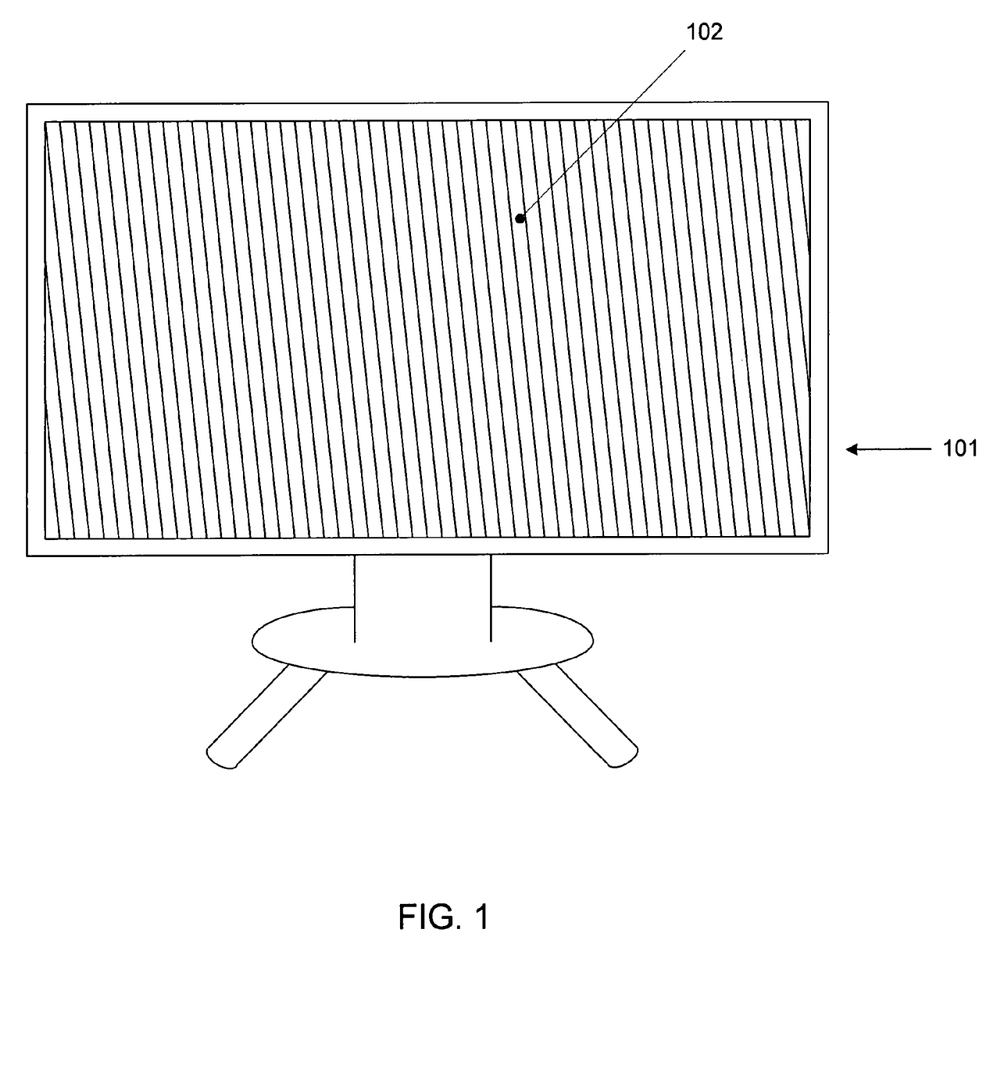
FIG. 1 illustrates a display device with a lenticular screen or lenticular array attached.

Current autostereoscopic imaging technology, for example the Real D SynthaGram, utilizes an array of Winnek slanted lenticular elements on a display surface as illustrated in FIG. 1 to form a lenticular array. FIG. 1 illustrates a flat-panel display monitor device 101 with a lenticular screen 102 positioned over the flat-panel display monitor device surface. The lenticular screen is configured to direct different components of the autostereoscopic view to different segments of the observer's viewing zone.

Lenticular arrays may also be referred to as a micro-lens array, a lenticular screen, a lens screen, or a lens sheet. The lens sheet, as described by Okoshi in "Three Dimensional Imaging Techniques," Academic Press, NY, 1976, is constructed using a multiplicity of semi-cylindrical parallel rows of corduroy-like lens elements. In this configuration, software provides an interdigitation mapping technique that operates on multiple perspective image views. This interdigitation mapping technique enables an observer viewing the display to see one of the several left-eye views with his left eye, and one of the several right-eye views with his right eye. This technique enables an observer to view a stereoscopic image or motion picture without the need for special glasses or other selection devices. The observer is not required to wear selection devices because image selection takes place at or close to the plane of the display screen.

A major commercial problem with regard to lenticular arrays has to do with the fact that viewing characteristics, especially the angular extent of the viewing zones, change with the passage of time as the display warms up and reaches steady-state temperature. For example, after being turned on, a display screen and associated lenticular array will increase in temperature, in the course of an hour, from 75 to 105 degrees Fahrenheit. The lenticular array, typically epoxy lenticules coated on a glass substrate, does not expand at the same rate as the display. A liquid crystal display, for example, is a glass chamber filled with liquid crystal material that has associated with it a printed matrix color screen and polarizers. The display and the lens screen are heated as a by-product of illuminating the display, as in the case of a liquid crystal display, or as a result of the inefficiencies of emissive elements as is the case for a plasma display.

Additional heat sources that cause temperature changes over time between initial start-up and steady state operating conditions include heat contributions resulting from other associated electronic functions. At room temperature, the lenticular array lenticules have a specified relative position with respect to the display's pixels. As the lenticular array begins to warm up and reach its steady state operating temperature, the dimensional relationship of the lens sheet and the display changes. This dimensional relationship change produces a repositioning of the lenticules relative to the pixels. Even a minute temperature created shift causes the optical characteristics of the autostereoscopic image to change. These changes in optical characteristics degrade the autostereoscopic image presentation quality when viewed by an observer. As an example, if the interdigitation model employs a pitch value (distance between lenticule aspects, such as distance between maximum points on adjacent lenticules) that is off by only 0.1%, the optimum viewing distance will be substantially altered. In effect the width of the viewing zone is reduced because of this change in pitch making it difficult to find a location in which to view the autostereoscopic image.

With respect to specific temperature effects, when the display is turned on, both the display and the lens sheet begin operation at room temperature and gradually heat up. Current stereoscopic display solutions employ an interdigitation model for use at steady state operating temperature and accept that the autostereoscopic images presented may not be entirely useful until the monitor is fully warmed up. The problem with these current designs is that the angular extent of the viewing zones may be significantly reduced during the warm up period.

Thus it would be advantageous to offer a display design that adjusts for temperature variations affecting the lenticular screen's optical display properties including pitch, offset, and slant relative to the display screen. Adjusting for temperature-related variation in those lenticular screen optical display properties that enter into the interdigitation calculation may allow the highest image quality during the initial warm up period, and throughout the period during which the autostereoscopic monitor is warming up, and finally to maintain optimum performance during steady state operation for long intervals of time. Such an autostereoscopic design may provide for an enhanced viewing experience as compared against previously available designs.

SUMMARY OF THE INVENTION

According to one aspect of the present design, there is provided an apparatus for displaying autostereoscopic images. The apparatus comprises a display monitor, a lenticular array associated with said monitor, and a computational engine associated with the lenticular array, wherein the computational engine is configured to assess temperature expansion effects for the lenticular array and perform an interdigitation function based on the temperature expansion effects for the lenticular array.

According to a second aspect of the design, there is provided a method for interdigitating autostereoscopic images for a display associated with a lenticular array. The method comprises computing a temperature adjustment factor, the temperature adjustment factor relating an amount of expected lenticular array dimensional change to an expected temperature encountered by the lenticular array. The method further comprises interdigitating images based on the temperature adjustment factor.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some of the embodiments may be included in or substituted for those of others.

The present design provides an apparatus and method for adjusting the interdigitation parameters values and configuration values, based on display temperature, during the interdigitation process when combining multiple source-views into an image map ready for display through a lenticular screen for autostereoscopic viewing. The interdigitation parameters may include, but are not limited to, lenticular pitch, offset, and/or slant. Lenticular pitch is considered to be the most important of these. An alternative sometimes used for representing the same quantity as lenticular pitch is its reciprocal, lenticular density.

Figure 2:
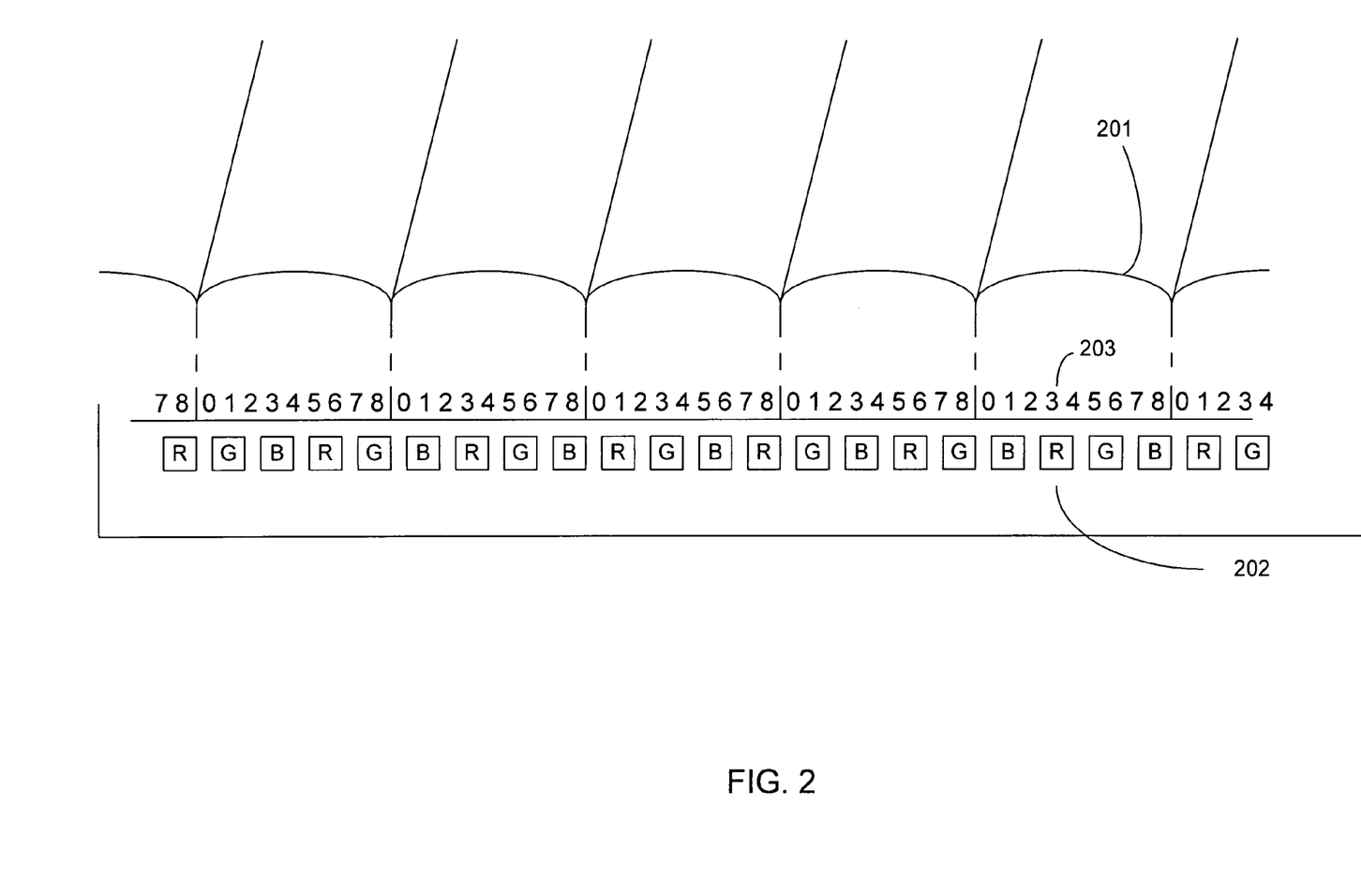
FIG. 2 is a profile of a lenticule within a micro-lens array and the sub-pixels it covers.

Today's autostereoscopic designs employ an interdigitation process that takes pixels or sub-pixels (the red, green, or blue component of a single pixel) from all of the different source-view images, and arranges them into a resultant interdigitated image. For example, a sub-pixel from a particular source-view image might be copied to the interdigitated image if that sub-pixel will appear under the portion of a micro-lens in the lenticular array corresponding to a particular viewing zone for the person viewing the image. Interdigitated sub-pixel data is then passed to the actual sub-pixels in the display device, and passed through a lenticular micro-lens array as illustrated in FIG. 2. Passing of sub-pixel data in this manner enables rendering an autostereoscopic image.

FIG. 2 illustrates a profile of a lenticular array, where lenticule 201 is shown with the lens element faces outward from the screen. Device sub-pixels at 202 each generate a dot of light. These dots carry red, green, or blue information. These sub-pixels represent dots of light that are discrete and separately addressable. In FIG. 2, each lenticule is divided up into multiple sub-regions at point 203. In this illustration, nine sub-regions are shown, numbered 0 through 8, corresponding to the source-view images that are represented under the appropriate lenticule sub-regions. For example, the middle source view, number 4 at 204, should have its data positioned directly underneath the middle sub-region of the lenticule.

Current designs may also sample and interpolate at the pixel or sub-pixel level rather than simply selecting individual pixels for interdigitation. In summary, current designs employ a computational process where multiple views are interdigitated for display through a particular lenticular screen configuration, resulting in a working autostereoscopic display device.

The interdigitation process requires an accurate mathematical model of the lenticular screen's optical display properties. These properties typically include the physical arrangement of the lenticular array. The principal parameters are pitch, offset, and slant as related to the coordinate system employed.

Depending on the nature of the computation model, optimization possibilities exist that are specific to a particular viewing distance. Viewing distance is pertinent because the lenticular pitch used for interdigitation is typically a fraction of a percent greater than that of the actual perspective columns, so that the lenticular effect will converge inward at a finite viewing distance. The interdigitation model may alternately allow for pitch, slant, and offset values applicable to all viewing distances, with the interdigitation process compensating based on the requested viewing distance. The interdigitation process may require additional data about the lenticular screen, such as the focal length and indices of refraction of different lens sheet components. Additionally, the interdigitation process models the physical attributes of the overall display (including width and height) and its pixel arrangement (pixel resolution and how sub-pixels are arranged). For the interdigitation process to effectively deliver a high quality three-dimensional scene that is pleasing to look at, all of the data that describes the screen and its lens sheet must be accurate.

The display pitch value used by the interdigitation process is particularly critical because any error is cumulative across the width of the display. In the example outlined above, a pitch value that is off by 0.1%, where the lenticular array includes approximately 600 lenticular columns, can provide an autostereoscopic effect on the left side of the screen. On the right side of the screen, the pitch-per-lenticule error of 0.1% accumulates across 600 lenticules to an error of 60%. Errors of well below 1% cause the interdigitation process to become ineffectual, and a pitch error of just 0.03% changes the interdigitation's effective viewing distance by many inches.

Current stereoscopic display solutions are limited to employing the interdigitation model at a steady state operating temperature while accepting that the autostereoscopic images presented may not be entirely useful until the monitor is fully warmed up. The problem with these designs is that the angular extent of the viewing zones may be significantly reduced during the warm up period.

In contrast, the present design may allow adjustments to the interdigitation pitch and other configuration values as needed, in order for the unit to function properly at start-up, during warm-up, and at other times when the display is not at normal operating temperature or at steady state operating temperature. For any given viewing distance, the interdigitation pitch has a specific value, assuming that the unit is already at normal operating temperature. The present design may provide the observer with a consistency of viewing experience without regard to the operating temperature of the display or the lens sheet or requiring any operator intervention.

Figure 3:
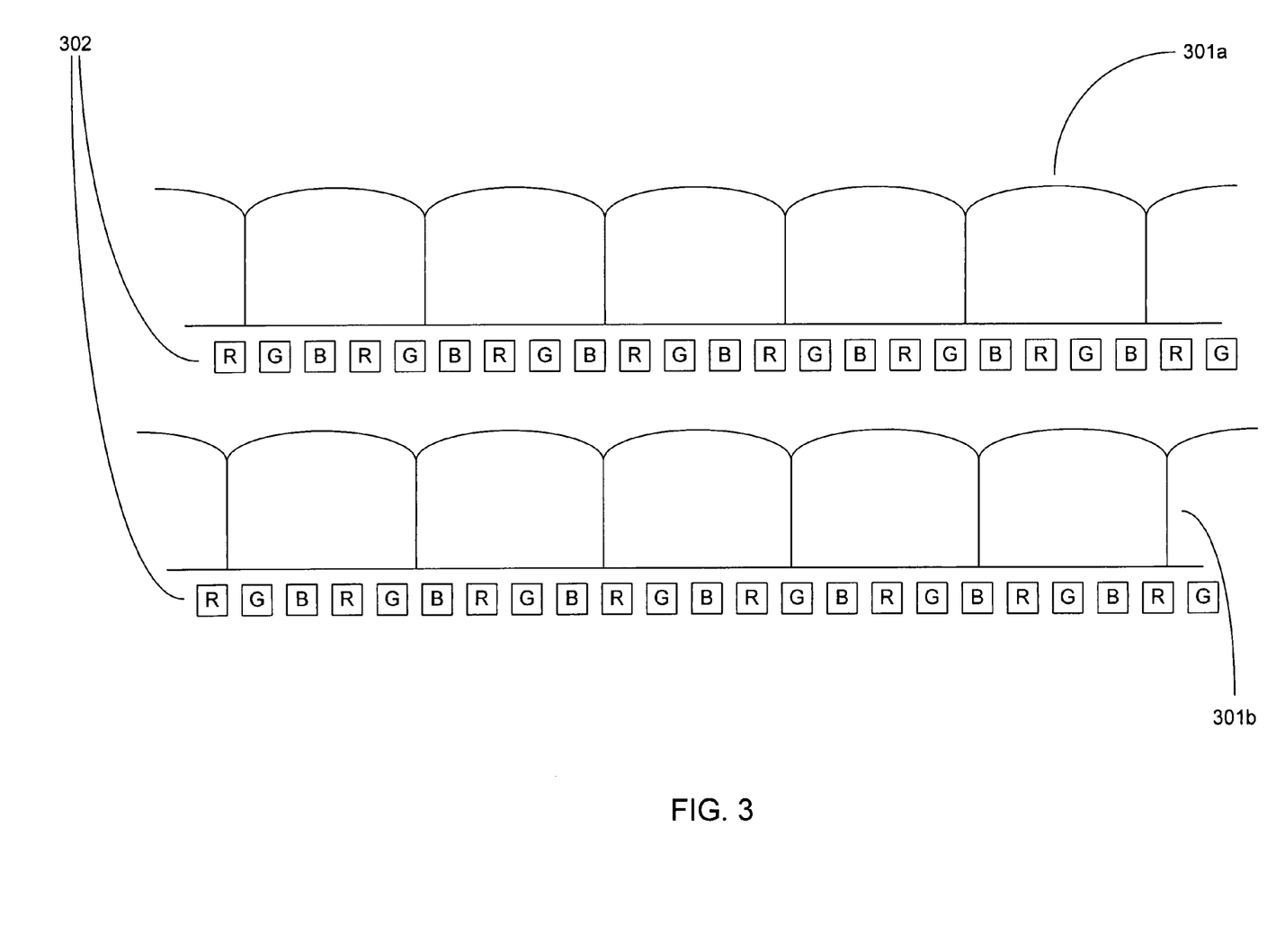
FIG. 3 shows a cross-section of the lenticular array, and the effect of increased temperature.

One potential source of pitch variation is temperature. When the display is turned on, the display (and the lens sheet)

begin operation at room temperature and gradually heats up. Even though the lenticular array may be laminated to a layer of glass or hard plastic, or preferably as plastic or epoxy lenslets cast onto a glass substrate, expansion occurs between start up and steady state operating temperature as illustrated in FIG. 3 in a manner sufficient to spoil the stereoscopic effect. FIG. 3 illustrates a cross-section of the lenticular array and the effect of increased temperature. Pixel plane 302 underlies the lenticular array, and the size of the pixel layout remains unchanged. Lenticular array 301a illustrates the relationship when the lenticular array is cold. Lenticular array 301b shows the relationship when the lenticular array has been heated to normal operating temperature. The lenticular array has expanded slightly in size (size expansion has been exaggerated in FIG. 3 for illustration purposes).

Figure 4:
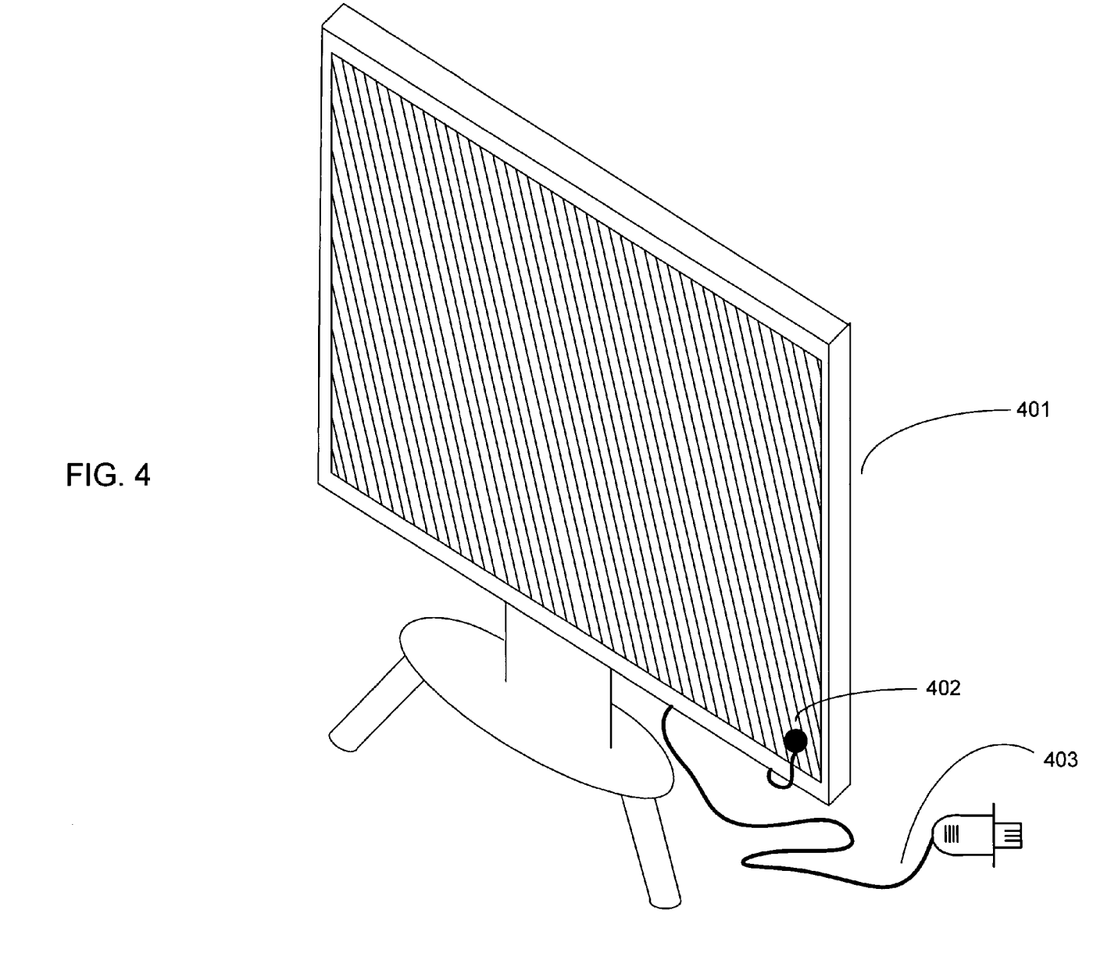
FIG. 4 is an autostereoscopic display with a temperature sensor attached thereto.

FIG. 4 illustrates an autostereoscopic lenticular array and display screen 401 having components and interfaces for a temperature compensation system, where the particular arrangement illustrated in FIG. 4 may position a temperature sensor 402 adjacent or proximate the lens sheet. Ideally, the temperature sensor 402 is invisible or nearly invisible, with the sensor mechanism built into the device and wiring obscured by the display's bezel. A cable and connector 403 may provide the physical interface between the temperature sensor 402 and the device that computes the interdigitation function (not shown). If that computation engine resides within the display unit, the temperature sensor needs no external physical interface.

In this arrangement, the present design may collect data from a temperature sensor 402 positioned or affixed proximate the lenticular screen. The data collected from this temperature sensor may provide input to the device, such as a processor or computing device, employed to compute the interdigitation function. Based on this input, the present design may adjust interdigitation pitch, offset, and/or slant, and may adjust based on other pertinent components. The present design implements the interdigitation engine with temperature compensation realized for the display using firmware. Alternately, the present design may be implemented for other configurations, such as in systems where the interdigitation function is performed by a computer separate from the display. In this arrangement, the present design may provide a cable 403 sufficient to connect the temperature sensor to one of the computer's device ports. Other implementations may be feasible depending on circumstances.

The temperature sensor 402 may be configured to measure and report the lens sheet's current temperature. Temperature sensor 402 may initially measure and report temperatures corresponding to the typical system start up temperature, and subsequently may measure intermediate temperature settings between start up temperature and normal operating temperature. Measured temperature values typically vary or are influenced by a number of factors, including changes in ambient temperature, humidity, airflow, and physical inhibitions to cooling. These factors may produce temperatures higher than normal or lower than the expected start-up temperature(s). Similarly, the rate of cooling while the unit is turned off may vary, resulting in possible variations of start up temperature if the display is turned back on before it has fully cooled. The present design may employ one or more temperature sensors sufficient to collect and report data representative of the overall lenticular screen temperature value. In situations where the temperature sensor does not provide a sufficient representation of the overall lenticular screen temperature value the present design may include additional mathematical functions for translating the measured temperature into an estimated most-of-lens-sheet temperature value. For example, if temperature readings accelerate above a certain quantity and then level off, such a phenomenon may indicate other portions of the lens sheet not proximate or close to a temperature sensor may be exposed to a particularly cold condition, and account for this by decreasing the measured temperature. The present design can assume that the lens sheet is isotropic for purposes of simplifying the mathematical functions, but a mapping may also be employed, such as a mapping based on anisotropic lens sheet assumptions.

Although the present discussion makes direct reference to the aforementioned lenticular array, these teachings apply equally well to the alternative raster barrier selection device that is, for the most part, optically interchangeable with the presently discussed refractive lenticular optics. Such devices suffer from the same temperature expansion problems as lenticular arrays, and compensation for such temperature expansion issues using the concepts provided herein may be highly beneficial to such devices.

Figure 5:
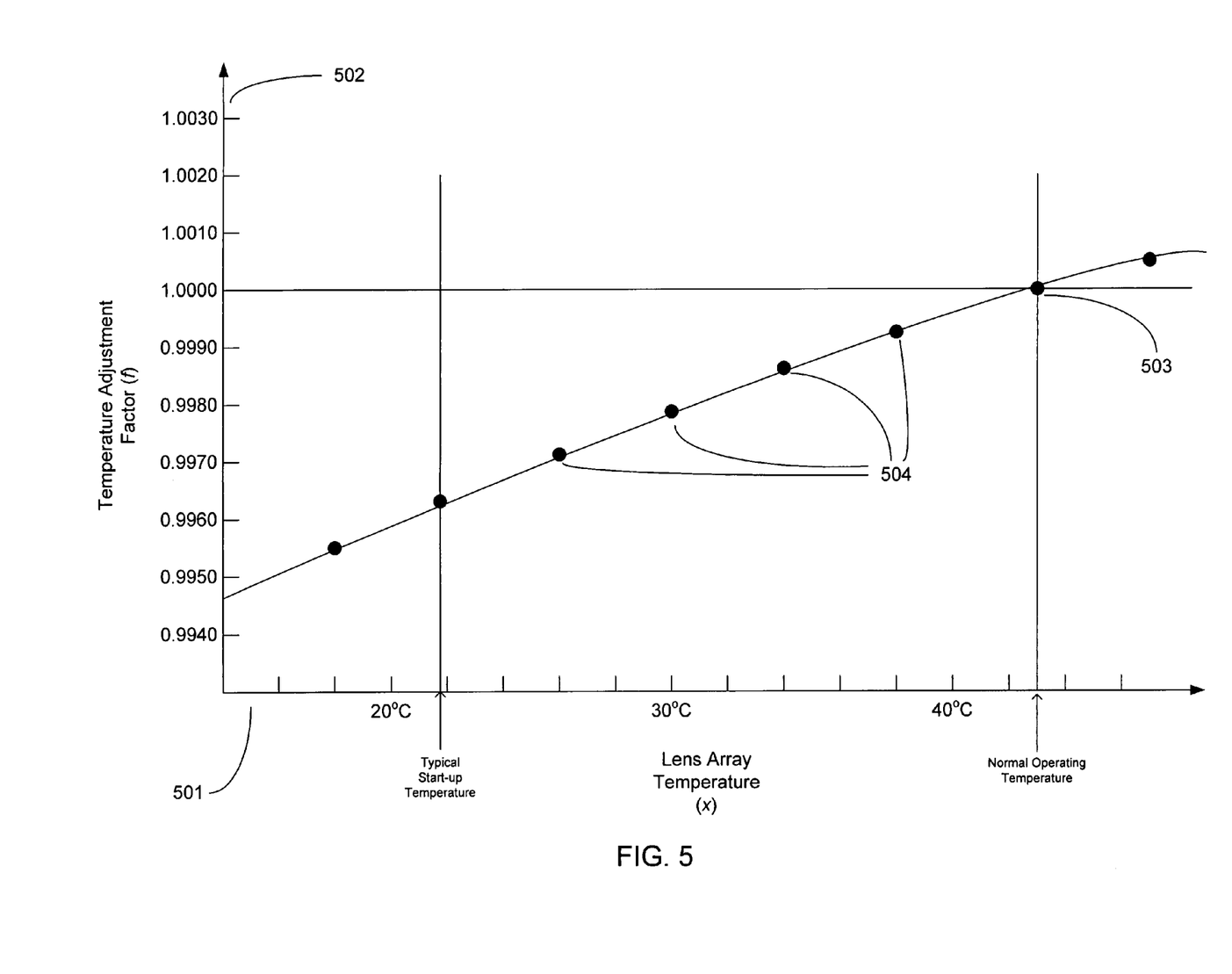
FIG. 5 is a graph depicting one possible representation of the relationship between the lenticular array temperature and the temperature-related adjustment factor for a particular display model.

In certain display monitors, the relationship between temperature and an adjustment factor applied to the pitch value is approximately linear and is represented by a graph illustrated in FIG. 5. Other display monitors may exhibit a relationship between temperature and the adjustment factor to be applied to the pitch value that is non-linear, having increased resistance to pitch change at higher temperatures. The non-linear relationship may result due to lens sheet attributes such as lamination to a material like glass that expands more slowly than plastic substrate arrays. FIG. 5 is a graph showing one possible representation of the relationship between the lens-array element temperature and the temperature-related adjustment factor, for a particular display model. The temperature of the lens-array element, as measured by a temperature sensor, is represented in FIG. 5 as the graph horizontal axis 501. The vertical axis 502 of this graph represents the range of temperature adjustment factor values. The normal operating temperature for this particular display monitor model is shown at point 503 on the graph illustrated in FIG. 5. At this temperature, the temperature adjustment factor is 1.0, indicating that no adjustment is needed. A set of pre-tested or baseline data points relating lens array temperature to the adjustment factor are shown at point 504. The present design may calculate an additional set of data points by interpolating between the pre-tested data points at point 504, where interpolation comprises a mathematical function including, but not limited to, averaging, weighted averaging, spline functions, and so forth.

The present design temperature sensor may measure and report a lens array temperature with a value of x. The present design may use a function that converts lens array temperature x to adjustment factor f. This function is represented by the graph illustrated in FIG. 5, relating lens array temperature and adjustment factor. Function f may be a linear relationship or, depending on lens sheet attributes (such as lamination to a material like glass that expands more slowly than plastic substrate lens arrays), the relationship may be non-linear, having increased resistance to pitch change at higher temperatures. Such a function may be developed based on temperature observations of the lens array, such as taking readings at various points on the array when exposed to different temperature conditions, or may be developed based on the physics of the construction of the lens array and known temperature properties thereof. The temperature adjustment factor f in the present case has a value of 1.0 when x equals the normal or expected operating temperature.

A temperature-compensated pitch value, p, is obtained using the following formula:

$$p = p_0 \times f \quad (1)$$

where $p_0$ is the pitch value previous to temperature compensation. The temperature adjustment factor f may be applied to other configuration values as applicable. For example, if the lens thickness quantity is used to compute the pitch value for a particular viewing distance, it may be appropriate to apply the temperature adjustment factor f to the pitch, and then applying f to the lens thickness value used for computing the final interdigitation pitch, which will now include compensations for both temperature and viewing distance.

The function used to translate temperature x to temperature adjustment factor f may take a number of computational forms. One implementation may involve a look-up table of predetermined approximate values based on experimental data, and a mathematical function that can apply interpolation to these approximate values in that look-up table sufficient to translate any temperature x into a temperature adjustment factor f.

In operation, as an example, if a lenticular lens array tends to expand when temperature increases, the array will expand by a certain dimension. The level of expansion may be known or quantifiable. For example, an increase of 10 degrees from room temperature may cause the lens array to expand by a certain amount, such as 0.5 per cent. Thus a 20 inch wide array in this example may expand 0.1 inch. Such an expansion, without compensation in the interdigitation process for this expansion, would normally cause the image quality perceived by a viewer to degrade.

The present design computes the temperature adjustment factor f, and if the factor f is one, no expansion is anticipated or compensated for by the interdigitation process. If the temperature adjustment factor is greater than 1.0, such as in the foregoing example where heat causes expansion of the lens array, the interdigitation program accounts for this expansion by altering the pixels displayed, such as by moving pixels to be under the expanded part of the lens array. For example, assume in the foregoing example that a lens sheet comprises a lenticule having an eight pixel width, meaning that a cross section of the lenticular array spans eight pixels. Assume that the lenticule being considered is at the most outward point of the lenticular array, and assume uniform temperature distribution and expansion uniform outward from the center of the lens array. The outermost lenticule might be expected to move 0.5 per cent, or 0.1 inches for a 20 inch lenticular array, indicating that some of the eight pixels under this outward lenticule may need to change color, such as from blue to red, in order to properly convey the image to the user.

In the interdigitation process, the makeup of the lenticular array is factored in to the multiple views transmitted to the display, and if the lenticular array is larger or smaller than normal, a different allocation of pixels may be warranted. In the present design, whether assessed based on single or multiple temperature readings or other factors such as time of operation, the expected or actual expansion of the array is related to the temperature adjustment factor f. If f is greater than 1.0, the lenticular array is expected to expand, typically related to the temperature adjustment factor by some equation, such as a linear or nonlinear relationship. A temperature adjustment factor of 1.005 may cause an expansion of 0.005 per cent of the total screen width, or pitch, or some other dimension or attribute, and the interdigitation program allocates pixels for best viewing under this level of expansion.

The present design may also be configured to adjust the interdigitation pitch, offset, slant and other configuration values to compensate for varying lens array temperature without the use a temperature sensor. This configuration of the present design may measure, for example, time to estimate the temperature-related effects on the lenticular array and display screen for dimensional change compensation. Typically, today's computational devices (i.e. processors) include timing functions. The present design may utilize an available resident computational device to measure time and thus not require a physical sensor or other additional hardware. The present design may include a lookup table of adjustment factor f values based on expected temperature of the monitor lens array as a function of time and may relate these measurements to changes in the interdigitation parameters relating to pitch, offset, slant, and other variables.

Additionally, the present design may be configured to include a lookup table of adjustment factor f values based on measurements of observed changes to the differential expansion of the lens array and the display screen. These measurements may be acquired by presenting a plurality of target elements on the display monitor and by observing the shifts of these target elements due to changes in temperature and plotting observed changes relative to viewing distance.

If the computing device that performs the interdigitation function resides within the display monitor unit, the present design may readily access temperature, time, or other pertinent information at times when the display monitor is activated and deactivated and the interdigitation function may correlate the time of operational monitor activity to assumed temperature values. If the interdigitation engine is located within a computer or device separate from the display monitor, the present design may provide a memory-resident utility or other mechanism that detects and records time data for all events where the computer or separate device is turned on and off. The present design may detect and record time data relating monitor screen-save or power-save functions that turn on or off the display monitor while the computer system remains on, and may adjust parameters accordingly.

Such an arrangement where the computer or device is separate from the display device may provide the adjustment factor f in a manner similar to present design configured with a temperature sensor. As with the temperature sensor approach, the function to compute f is based on an internal lookup table created from experimental data obtained for the time measure configuration of the present design. In this arrangement, there is no need to estimate lens-sheet surface temperature. This approach may quantify temperature-related changes to the lenticular pitch based on measured time after cold start-up.

Figure 6:
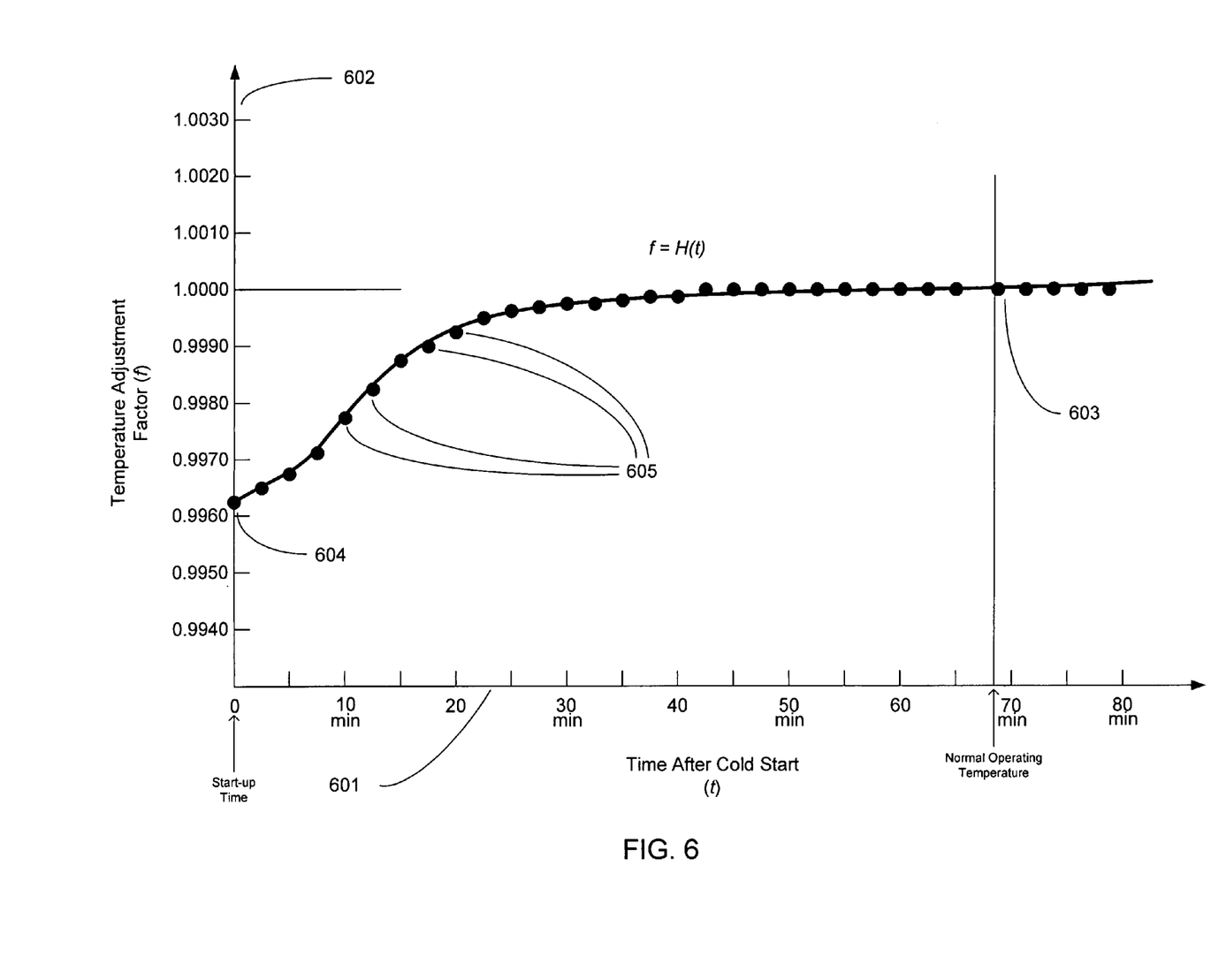
FIG. 6 illustrates a graph representing the relationship between the elapsed time, from a typical cold monitor start-up, and the temperature-related adjustment factor, for a particular display model.

FIG. 6 is a graph showing one possible representation of the relationship between the elapsed time, from a typical cold monitor start-up, and the temperature-related adjustment factor, for a particular display model. This graph represents the heating function H( ). The elapsed time from cold start-up of the monitor, measured by a timing circuit in the computational device that also processes the interdigitation, is represented in FIG. 6 as the graph horizontal axis 601. The vertical axis 602 of the graph illustrated in FIG. 6 represents the range of temperature adjustment factor values. The point on the graph that represents the elapsed time by which the display is expected to reach normal operating temperature is shown at point 603. At this point, the temperature adjustment factor is 1.0, indicating that no adjustment is needed. The point on the graph representing the temperature adjustment factor that is needed when the display device is cold at start-up is shown at point 604. The present design may calculate an additional set of data points by interpolating between the pre-tested data points 605.

As with the temperature-sensor approach, the function that is used to compute f is based on an internal look-up table created from experimental data. There is no need to estimate lens-sheet surface temperature; it typically makes more sense to bypass temperature data and simply quantify temperature-related changes to the lenticular pitch based on measured time after cold start-up.

One implementation includes a set of data points based on experimental data, and a mathematical function that can apply interpolation to these data points to find intermediate values. These values may be stored in a lookup table sufficient to translate any time after cold start into a temperature adjustment factor f. Because this relationship is described by a curved graph, the interpolation method used to find f values based on elapsed time may be a curved interpolation algorithm.

One additional complexity of the elapsed time-based approach is that there is no guarantee that the display monitor is cold upon start-up. For example, the autostereoscopic lenticular array and display screen system may have been shut down for only a few seconds or minutes before being restarted. Another possible issue is that computer systems are often equipped with screen-saver functions that turn off the display, meaning that a display shut-down may occur without the computer that controls it being shut down. For these reasons, the function used to compute the temperature adjustment factor based on elapsed time may include data that models all of the following four scenarios:

1) Changes to the temperature adjustment factor f between cold start-up and normal operating temperature;
2) Changes to f between start-up and normal operating temperature, where the start-up is not cold, but already at some temperature between cold and normal operating temperature;
3) Changes to the f during partial cool-down, starting from normal operating temperature; and
4) Changes to f during partial cool-down, starting from some intermediate temperature before normal operating temperature is reached.

The present design may accommodate Scenario 1 by employing the heating function H( ) as previously illustrated in FIG. 6. The heating function defines the elapsed time from cold start-up as t. Computing the heating function H( ) enables the temperature adjustment factor f to be determined based on t using the following formula:

$$f = H(t) \quad (2)$$

In Scenario 2, the display monitor is not cold at the time of start-up, perhaps having been in use very recently, then shut down momentarily, and in the process of being restarted. The present design may accommodate Scenario 2 by employing a modified Scenario 1 heating function H( ) In this modified heating function, $f_c$ represents the temperature adjustment factor was reached during cool-down at the time the display was restarted. Since the display did not fully cool down in this scenario, $f_c$ should be greater than H(0), which is the f value at cold start-up; where 1 is the f value at normal operating temperature. The system derives the value of $f_c$ and its computational form is presented below in Scenarios 3 and 4. With the actual elapsed time after non-cold start-up defined as t, the adjustment factor may be calculated using Equation (3):

$$f = f_c + \left((H(t) - H(0)) \times \frac{1 - f_c}{1 - H(0)}\right) \quad (3)$$

This equation reasonably assumes that warm-up from a not-cold starting point follows a similar curve to the H( ) function, but with its dynamic compressed due to decreased temperature differential.

Figure 7:
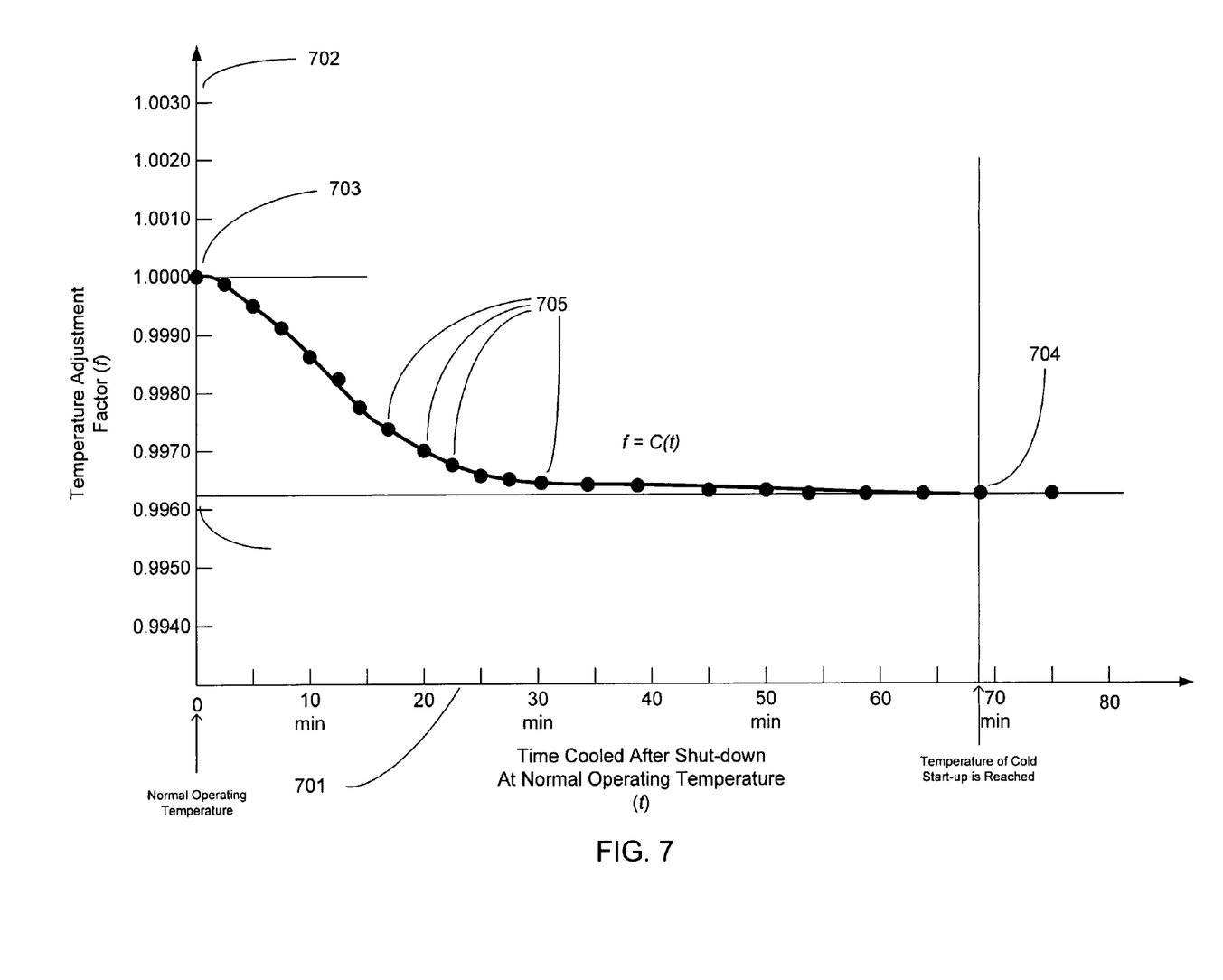
FIG. 7 is a graph representing the temperature-related adjustment factor associated with cooling of the lens-sheet when the display monitor is turned off, having begun the cool-down at the display's normal operating temperature.

In Scenario 3, the display monitor has been on long enough to reach normal operating temperature, and is then shut down for a period of time that only affords a partial cooling down of said display monitor. This scenario introduces a new function, C( ), which models the effect that cool-down from normal operating temperature has on the temperature adjustment factor and illustrated by the graph in FIG. 7. The C( ) function represents cooling of the lens-sheet when the display monitor unit is turned off, starting at normal operating temperature. The horizontal graph axis 701 represents the elapsed time from the shutdown of the monitor. The elapsed time may be measured by a timing circuit in the computational device that also processes the interdigitation. The vertical axis 702 of the graph illustrated in FIG. 7 shows the range of temperature adjustment factor values. The starting point, where no time has elapsed and the monitor is at normal operating temperature is shown at 703. The point on the graph at which the device is presumed to have reached its "cold" state is shown at 704. The present design may calculate an additional set of data points by interpolating between the pre-tested data points at 705.

Like the H( ) function shown in FIG. 6, the C( ) function may be implemented in accordance with the present design as a stored data set, specific to a particular model of display monitor, and may include a built-in capability providing interpolate values between data points. In this equation, t represents the amount of time elapsed starting from a shut-down at normal operating temperature. The temperature adjustment factor at the end of incomplete cool-down, $f_c$, may be computed as:

$$f_c = C(t) \quad (4)$$

This derived value of $f_c$ may be used in the Scenario 2 equation to determine the temperature adjustment factor f for that scenario, where the display is reheated after not cooling completely.

In Scenario 4, the display unit is shut down before it has reached normal operating temperature, and it remains off for some amount of time less than it takes to fully cool down. As in Scenario 3, the present design may determine the temperature adjustment factor at the end of the cool-down period, and may apply an inverse H( ) function to calculate an effective elapsed time from cold start-up $t_0$. Once the elapsed time from cold start-up $t_0$ is known, the value may be inserted into the Scenario 2 equation. The present design may apply a curve reduced proportionally based on how close the unit was relative to the temperature adjustment factor corresponding to normal operating temperature:

$$f_c = H(0) + \left((C(t) - H(0)) \times \frac{f_h - H(0)}{1 - H(0)}\right) \quad (5)$$

where $f_h$ is the f value that the temperature adjustment factor had reached at the time of shut-down (from either Scenario 1 or 2). H(0) is the temperature adjustment factor at cold start-up and also at the end of a complete cool-down, and t is the elapsed time between not-fully-warm shut-down and not-fully-cold restart. As in Scenario 3, the result is $f_c$, which may be used in the Scenario 2 equation as the display once again heats up.

In all cases where the temperature adjustment factor f is derived from time data rather than from a temperature sensor, certain assumptions are made to relate the display's environmental conditions. For example, if the ambient temperature is unusually low, or if the display is situated in an enclosure that restricts normal ventilation, the actual temperature of the lens-sheet can be affected in ways that the time-based data and equations will not normally accommodate. Typically, an autosteroscopic lenticular array and display screen are installed in a 'standard' manner in accordance with the manufacturer's specifications for thermal and other environmental considerations (i.e. service access areas). For these installations, the environmental effects on the heating and cooling graphs may be relatively minor. In certain situations involving unusual system installations, the data used by the present design to compute the H( ) and C( ) functions may require recalibration.

It may in many cases be sufficient to have one set of interdigitation values (pitch, slant, offset, etc.) to describe the entire lenticular screen, and to drive the interdigitation process for producing autostereoscopic imagery. Thus, even though heating of the lens-sheet may be unevenly distributed, uniform interdigitation settings tend to work well, and better than many previous designs that did not account for temperature fluctuations. To address uneven heating of the lens array, the present design may include a more complex interdigitation function that may allow different interdigitation settings to be calculated for different areas of the lenticular array. In this arrangement, the present design may accommodate uneven temperature gradients, assuming such temperature gradients are known or measurable, with greater accuracy.

Furthermore, the present design may combine the temperature sensing method with the elapsed time method. The temperature sensing method may be employed to determine or measure the temperature of the lens sheet at start up, and thus account for variations in ambient temperature.

The present design may provide for maintaining the desirable image characteristics of an autostereoscopic display using a lens array for image selection by compensating for the differential expansion resulting from changes in system operating temperature. The lenticular array is typically used in conjunction with a flat panel display to produce a panoramagram-type of stereoscopic image. The angular width of viewing zones and other attributes of the image are maintained from start up temperature to steady state operation, which in the context of indoor operation is a range of about 30 degrees Fahrenheit. As discussed above, the present design can maintain good performance over such a temperature range by changing the relative size of the interdigitated image essentially through pitch alterations so as to maintain the proper geometric relationship between the interdigitated display map subpixels and the lens array. This may be accomplished by understanding the temperature physics of the display system and applying experimentally derived curves relating dimensional changes to temperature and in some cases to elapsed time as it relates to temperature.

This design is not limited to any specific display type, as will be understood by those familiar with the art, but is generally applicable to many types of electronic displays and equipment associated therewith.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An autostereoscopic display monitor device, comprising:
   a display monitor;
   a lenticular array associated with said monitor; and
   a computational engine associated with the lenticular array and configured to compute a temperature adjustment factor, and an interdigitation parameter, wherein the temperature adjustment factor relates an amount of lenticular array dimensional change to an expected temperature encountered by the lenticular array, and wherein the interdigitation parameter is based on the temperature adjustment factor and used to interdigitate an image displayed on the display monitor, and wherein the temperature adjustment factor is further computed based on temperature changes between an enhanced start-up temperature and a normal operating temperature, wherein enhanced monitor start-up temperature is between ambient temperature and normal operating temperature, and further wherein said temperature changes are based on one from a group comprising actual temperature changes and estimated temperature changes.

2. The autostereoscopic display monitor device of claim 1, further comprising a temperature sensor mounted proximate the lenticular array and connected to the computational engine, wherein the computational engine receives temperature readings from the temperature sensor and computes the temperature adjustment factor based thereon.

3. The autostereoscopic display monitor device of claim 1, wherein the computational engine computes time from at least one power altering event to determine expected temperature associated with the lenticular array, and wherein the temperature adjustment factor is based on time computed from the power event.

4. The autostereoscopic display monitor device of claim 1, wherein the computational engine assesses a time the display device is operational and computes the temperature adjustment factor based on the time assessed.

5. The autostereoscopic display monitor device of claim 1, wherein the temperature adjustment factor is further computed based on temperature changes between a cold start-up temperature and a normal operating temperature, wherein said temperature changes are based on one from a group comprising actual temperature changes and estimated temperature changes.

6. The autostereoscopic display monitor device of claim 4, wherein the temperature adjustment factor is further computed based on time measurements sufficient to predict temperature-related effects on the temperature adjustment factor.

7. The autostereoscopic display monitor device of claim 1, wherein the temperature adjustment factor is further computed based on temperature changes during partial monitor cool-down from normal operating temperature.

8. The autostereoscopic display monitor device of claim 4, wherein the temperature adjustment factor is further computed based on temperature changes during a partial cool-down period starting from an intermediate temperature before achieving normal operating temperature.

9. A method for interdigitating autostereoscopic images for a display associated with a lenticular array, comprising:
   computing a temperature adjustment factor, the temperature adjustment factor relating an amount of expected lenticular array dimensional change to an expected temperature encountered by the lenticular array, wherein the temperature adjustment factor is further computed based on temperature changes between an enhanced monitor start-up temperature and a normal operating temperature, wherein enhanced monitor start-up temperature is between ambient temperature and normal operating temperature, and further wherein said temperature changes are based on one from a group comprising actual temperature changes and estimated temperature changes; and
   interdigitating images based on the temperature adjustment factor.

10. The method of claim 9, wherein the computing of the temperature adjustment factor comprises receiving temperature readings from a temperature sensor mounted proximate the lenticular array.

11. The method of claim 9, wherein the computing of the temperature adjustment factor comprises computing time from a power event to determine expected temperature associated with the lenticular array, and wherein the temperature adjustment factor is based on time computed from the power event.

12. The method of claim 9, wherein the computing of the temperature adjustment factor comprises assessing a time the display is operational and computes the temperature adjustment factor based on the time assessed.

13. In an autostereoscopic display system wherein a lenticular array is arranged in juxtaposition with a display having a display surface, the improvement comprising:
   a computational engine associated with the lenticular array configured to assess temperature expansion effects for the lenticular array, to perform an interdigitation function based on the temperature expansion effects for the lenticular array, and to interdigitate images based on the interdigitation function, wherein the interdigitation function is based on a temperature adjustment factor, and wherein the temperature adjustment factor is further computed based on temperature changes between an enhanced start-up temperature and a normal operating temperature, wherein enhanced monitor start-up temperature is between ambient temperature and normal operating temperature, and further wherein said temperature changes are based on one from a group comprising actual temperature changes and estimated temperature changes.

14. The autostereoscopic display system of claim 13, the improvement further comprising a temperature sensor mounted proximate the lenticular array and connected to the computational engine, wherein the computational engine receives temperature readings from the temperature display and computes a temperature adjustment factor based thereon.

15. The autostereoscopic display system of claim 13, wherein the computational engine computes time from a power event to determine expected temperature associated with the lenticular array, and wherein the computational engine computes a temperature adjustment factor based on time computed from the power event.

16. The autostereoscopic display system of claim 13, wherein the computational engine assesses a time the display device is operational and computes a temperature adjustment factor based on the time assessed.

17. The autostereoscopic display system of claim 16, wherein the temperature adjustment factor is further computed based on temperature changes between a cold start-up temperature and a normal operating temperature.

18. The autostereoscopic display system of claim 13, wherein the computational engine assesses expected lenticular pitch changes and alters interdigitated images based on the expected lenticular pitch changes.

19. The autostereoscopic display system of claim 13, wherein temperature expansion effects comprise pitch changes to the lenticular array.

20. The autostereoscopic display system of claim 13, wherein temperature expansion effects comprise at least one from a group comprising:
   lenticular density;
   lenticular offset; and
   lenticular slant.

21. An autostereoscopic display monitor device, comprising:
   a display monitor;
   a lenticular array associated with said monitor; and
   a computational engine associated with the lenticular array and configured to compute a temperature adjustment factor, and an interdigitation parameter, wherein the temperature adjustment factor relates an amount of lenticular array dimensional change to an expected temperature encountered by the lenticular array, and wherein the interdigitation parameter is based on the temperature adjustment factor and used to interdigitate an image displayed on the display monitor, and wherein the temperature adjustment factor is further computed based on temperature changes during partial monitor cool-down from normal operating temperature, wherein said temperature changes are based on one from a group comprising actual temperature changes and estimated temperature changes.

22. The autostereoscopic display monitor device of claim 21, further comprising a temperature sensor mounted proximate the lenticular array and connected to the computational engine, wherein the computational engine receives temperature readings from the temperature sensor and computes the temperature adjustment factor based thereon.

23. The autostereoscopic display monitor device of claim 21, wherein the computational engine computes time from at least one power altering event to determine expected temperature associated with the lenticular array, and wherein the temperature adjustment factor is based on time computed from the power event.

24. The autostereoscopic display monitor device of claim 21, wherein the computational engine assesses a time the display device is operational and computes the temperature adjustment factor based on the time assessed.

25. The autostereoscopic display monitor device of claim 21, wherein the temperature adjustment factor is further computed based on temperature changes between a cold start-up temperature and a normal operating temperature, wherein said temperature changes are based on one from a group comprising actual temperature changes and estimated temperature changes.

26. The autostereoscopic display monitor device of claim 24, wherein the temperature adjustment factor is further computed based on time measurements sufficient to predict temperature-related effects on the temperature adjustment factor.

27. The autostereoscopic display monitor device of claim 21, wherein the temperature adjustment factor is further computed based on temperature changes between an enhanced start-up temperature and a normal operating temperature, wherein enhanced monitor start-up temperature is between ambient temperature and normal operating temperature.

28. The autostereoscopic display monitor device of claim 24, wherein the temperature adjustment factor is further computed based on temperature changes during a partial cool-down period starting from an intermediate temperature before achieving normal operating temperature.

29. A method for interdigitating autostereoscopic images for a display associated with a lenticular array, comprising:
  computing a temperature adjustment factor, the temperature adjustment factor relating an amount of expected lenticular array dimensional change to an expected temperature encountered by the lenticular array, wherein the temperature adjustment factor is further computed based on temperature changes during partial monitor cool-down from normal operating temperature, wherein said temperature changes are based on one from a group comprising actual temperature changes and estimated temperature changes; and
  interdigitating images based on the temperature adjustment factor.

30. The method of claim 29, wherein the computing of the temperature adjustment factor comprises receiving temperature readings from a temperature sensor mounted proximate the lenticular array.

31. The method of claim 29, wherein the computing of the temperature adjustment factor comprises computing time from a power event to determine expected temperature associated with the lenticular array, and wherein the temperature adjustment factor is based on time computed from the power event.

32. The method of claim 29, wherein the computing of the temperature adjustment factor comprises assessing a time the display is operational and computes the temperature adjustment factor based on the time assessed.

33. In an autostereoscopic display system wherein a lenticular array is arranged in juxtaposition with a display having a display surface, the improvement comprising:
  a computational engine associated with the lenticular array configured to assess temperature expansion effects for the lenticular array, to perform an interdigitation function based on the temperature expansion effects for the lenticular array, and to interdigitate images based on the interdigitation function, wherein the interdigitation function is based on a temperature adjustment factor, and wherein the temperature adjustment factor is further computed based the temperature adjustment factor is further computed based on temperature changes during partial monitor cool-down from normal operating temperature, wherein said temperature changes are based on one from a group comprising actual temperature changes and estimated temperature changes.

34. The autostereoscopic display system of claim 33, the improvement further comprising a temperature sensor mounted proximate the lenticular array and connected to the computational engine, wherein the computational engine receives temperature readings from the temperature display and computes a temperature adjustment factor based thereon.

35. The autostereoscopic display system of claim 33, wherein the computational engine computes time from a power event to determine expected temperature associated with the lenticular array, and wherein the computational engine computes a temperature adjustment factor based on time computed from the power event.

36. The autostereoscopic display system of claim 33, wherein the computational engine assesses a time the display device is operational and computes a temperature adjustment factor based on the time assessed.

37. The autostereoscopic display system of claim 36, wherein the temperature adjustment factor is further computed based on temperature changes between a cold start-up temperature and a normal operating temperature.

38. The autostereoscopic display system of claim 33, wherein the computational engine assesses expected lenticular pitch changes and alters interdigitated images based on the expected lenticular pitch changes.

39. The autostereoscopic display system of claim 33, wherein temperature expansion effects comprise pitch changes to the lenticular array.

40. The autostereoscopic display system of claim 33, wherein temperature expansion effects comprise at least one from a group comprising:
  lenticular density;
  lenticular offset; and
  lenticular slant.

41. An autostereoscopic display monitor device, comprising:
  a display monitor;
  a lenticular array associated with said monitor; and
  a computational engine associated with the lenticular array and configured to compute a temperature adjustment factor, and an interdigitation parameter, wherein the temperature adjustment factor relates an amount of lenticular array dimensional change to an expected temperature encountered by the lenticular array, and wherein the interdigitation parameter is based on the temperature adjustment factor and used to interdigitate an image displayed on the display monitor, and wherein the temperature adjustment factor is further computed based on temperature changes during a partial cool-down period starting from an intermediate temperature before achieving normal operating temperature, wherein said temperature changes are based on one from a group comprising actual temperature changes and estimated temperature changes.

42. The autostereoscopic display monitor device of claim 41, further comprising a temperature sensor mounted proximate the lenticular array and connected to the computational engine, wherein the computational engine receives temperature readings from the temperature sensor and computes the temperature adjustment factor based thereon.

43. The autostereoscopic display monitor device of claim 41, wherein the computational engine computes time from at least one power altering event to determine expected temperature associated with the lenticular array, and wherein the temperature adjustment factor is based on time computed from the power event.

44. The autostereoscopic display monitor device of claim 41, wherein the computational engine assesses a time the display device is operational and computes the temperature adjustment factor based on the time assessed.

45. The autostereoscopic display monitor device of claim 41, wherein the temperature adjustment factor is further computed based on temperature changes between a cold start-up temperature and a normal operating temperature, wherein said temperature changes are based on one from a group comprising actual temperature changes and estimated temperature changes.

46. The autostereoscopic display monitor device of claim 44, wherein the temperature adjustment factor is further computed based on time measurements sufficient to predict temperature-related effects on the temperature adjustment factor.

47. The autostereoscopic display monitor device of claim 41, wherein the temperature adjustment factor is further computed based on temperature changes between an enhanced start-up temperature and a normal operating temperature, wherein enhanced monitor start-up temperature is between ambient temperature and normal operating temperature.

48. The autostereoscopic display monitor device of claim 41, wherein the temperature adjustment factor is further computed based on temperature changes during partial monitor cool-down from normal operating temperature.

49. A method for interdigitating autostereoscopic images for a display associated with a lenticular array, comprising:
  computing a temperature adjustment factor, the temperature adjustment factor relating an amount of expected lenticular array dimensional change to an expected temperature encountered by the lenticular array; and
  interdigitating images based on the temperature adjustment factor, wherein the temperature adjustment factor is further computed based on temperature changes during a partial cool-down period starting from an intermediate temperature before achieving normal operating temperature, wherein said temperature changes are based on one from a group comprising actual temperature changes and estimated temperature changes.

50. The method of claim 49, wherein the computing of the temperature adjustment factor comprises receiving temperature readings from a temperature sensor mounted proximate the lenticular array.

51. The method of claim 49, wherein the computing of the temperature adjustment factor comprises computing time from a power event to determine expected temperature associated with the lenticular array, and wherein the temperature adjustment factor is based on time computed from the power event.

52. The method of claim 49, wherein the computing of the temperature adjustment factor comprises assessing a time the display is operational and computes the temperature adjustment factor based on the time assessed.

53. In an autostereoscopic display system wherein a lenticular array is arranged in juxtaposition with a display having a display surface, the improvement comprising:
  a computational engine associated with the lenticular array configured to assess temperature expansion effects for the lenticular array, to perform an interdigitation function based on the temperature expansion effects for the lenticular array, and to interdigitate images based on the interdigitation function, wherein the interdigitation function is based on a temperature adjustment factor, and wherein the temperature adjustment factor is further computed based on temperature changes during a partial cool-down period starting from an intermediate temperature before achieving normal operating temperature, wherein said temperature changes are based on one from a group comprising actual temperature changes and estimated temperature changes.

54. The autostereoscopic display system of claim 53, the improvement further comprising a temperature sensor mounted proximate the lenticular array and connected to the computational engine, wherein the computational engine receives temperature readings from the temperature display and computes a temperature adjustment factor based thereon.

55. The autostereoscopic display system of claim 53, wherein the computational engine computes time from a power event to determine expected temperature associated with the lenticular array, and wherein the computational engine computes a temperature adjustment factor based on time computed from the power event.

56. The autostereoscopic display system of claim 53, wherein the computational engine assesses a time the display device is operational and computes a temperature adjustment factor based on the time assessed.

57. The autostereoscopic display system of claim 56, wherein the temperature adjustment factor is further computed based on temperature changes between a cold start-up temperature and a normal operating temperature.

58. The autostereoscopic display system of claim 53, wherein the computational engine assesses expected lenticular pitch changes and alters interdigitated images based on the expected lenticular pitch changes.

59. The autostereoscopic display system of claim 53, wherein temperature expansion effects comprise pitch changes to the lenticular array.

60. The autostereoscopic display system of claim 53, wherein temperature expansion effects comprise at least one from a group comprising:
  lenticular density;
  lenticular offset; and
  lenticular slant.

* * * * *